US012669222B2

(12) United States Patent
Bartlok et al.

(10) Patent No.: US 12,669,222 B2
(45) Date of Patent: Jun. 30, 2026

(54) BOIL-OFF MANAGEMENT SYSTEM

(71) Applicant: MAGNA Energy Storage Systems GesmbH, Sinabelkirchen (AT)

(72) Inventors: Guido Bartlok, Graz (AT); Daniel Kupelwieser, Graz (AT); Andreas Podlipnig, Markt Hartmannsdorf (AT); Florian Wimmer, Riegersburg (AT)

(73) Assignee: MAGNA Energy Storage Systems GesmbH, Sinabelkirchen (AT)

( * ) Notice: Subject to any disclaimer, the term of this patent is extended or adjusted under 35 U.S.C. 154(b) by 542 days.

(21) Appl. No.: 18/295,298

(22) Filed: Apr. 4, 2023

(65) Prior Publication Data

US 2023/0313949 A1     Oct. 5, 2023

(30) Foreign Application Priority Data

Apr. 4, 2022    (EP) .................................... 22166445

(51) Int. Cl.
*H01M 8/0662* (2016.01)
*B01D 53/86* (2006.01)
(Continued)

(52) U.S. Cl.
CPC ........ *F17C 13/123* (2013.01); *B01D 53/8671* (2013.01); *B60L 50/72* (2019.02);
(Continued)

(58) Field of Classification Search
CPC .. F17C 13/123; F17C 7/02; F17C 2205/0323; F17C 2221/012; F17C 2223/0161; F17C 2250/043; F17C 2250/0439; F17C 2260/044; F17C 2265/03; F17C 2270/0184; F17C 2201/056; F17C 2223/033;
(Continued)

(56) References Cited

U.S. PATENT DOCUMENTS

2014/0174103 A1* 6/2014 Kalra ........................ F23J 15/06
62/46.1

FOREIGN PATENT DOCUMENTS

| DE | 102015209621 A1 | 12/2016 |
| DE | 102016209170 A1 | 11/2017 |

(Continued)

OTHER PUBLICATIONS

European Search Report for Application No. 22166445.1, mailed Sep. 23, 2022, 4 pages.

*Primary Examiner* — Huy Tram Nguyen
(74) *Attorney, Agent, or Firm* — Jordan IP Law, LLC; Todd A. Vaughn

(57) ABSTRACT

A boil-off management system for a cryotank includes a boil-off conduit which is fluidically connectable to a cryotank via a boil-off valve. The boil-off management system further includes an air feed conduit and a mixing chamber for mixing a first medium (e.g., hydrogen) flowing in through the boil-off conduit with a second medium (e.g., air and/or oxygen) flowing in through the air feed conduit. A catalytic converter is arranged downstream of the mixing chamber and an outlet downstream of the catalytic converter. At least one enrichment apparatus is provided and configured to temporarily increase the proportion of the first medium flowing in through the boil-off conduit in relation to the second medium flowing in through the air feed conduit at the catalytic converter.

20 Claims, 2 Drawing Sheets

(51) Int. Cl.

| | |
|---|---|
| *B60L 50/72* | (2019.01) |
| *F17C 7/02* | (2006.01) |
| *F17C 13/12* | (2006.01) |
| *H01M 8/04082* | (2016.01) |

(52) U.S. Cl.
CPC ........... *F17C 7/02* (2013.01); *H01M 8/04208* (2013.01); *H01M 8/0662* (2013.01); *B01D 2251/102* (2013.01); *B01D 2251/11* (2013.01); *B01D 2257/108* (2013.01); *B01D 2258/0208* (2013.01); *B01D 2259/4566* (2013.01); *B60L 2270/12* (2013.01); *F17C 2205/0323* (2013.01); *F17C 2221/012* (2013.01); *F17C 2223/0161* (2013.01); *F17C 2250/043* (2013.01); *F17C 2250/0439* (2013.01); *F17C 2260/044* (2013.01); *F17C 2265/03* (2013.01); *F17C 2270/0184* (2013.01)

(58) Field of Classification Search
CPC ........ F17C 2250/0631; F17C 2260/042; F17C 2265/031; F17C 2270/0178; F17C 13/12; B01D 53/8671; B01D 2251/102; B01D 2251/11; B01D 2257/108; B01D 2258/0208; B01D 2259/4566; B60L 50/72; B60L 2270/12; H01M 8/04208; H01M 8/0662
USPC ......................................................... 422/107
See application file for complete search history.

(56) References Cited

FOREIGN PATENT DOCUMENTS

| | | |
|---|---|---|
| DE | 102017205642 A1 | 10/2018 |
| DE | 102020003894 A1 | 12/2021 |

* cited by examiner

BOIL-OFF MANAGEMENT SYSTEM

CROSS-REFERENCE TO RELATED APPLICATIONS

The present application claims priority under 35 U.S.C. § 119 to European Patent Application No. EP22166445.1 (filed Apr. 4, 2022), the contents of which are hereby incorporated by reference in its entirety.

TECHNICAL FIELD

The present disclosure relates to a boil-off management system (BOMS) for a cryotank, to a cryotank having such a boil-off management system and to a method of operating such a boil-off management system.

BACKGROUND

The unavoidable input of heat into a cryostatic vessel, i.e., a pressure reservoir for cryogenic liquefied gases ("cryotank"), for example, of a fuel cell vehicle operated with liquid hydrogen ($H_2$), results in continual evaporation of hydrogen. This allows the temperature in the tank to be kept constant ("boil-off"). In order to keep the pressure in the tank below a predetermined threshold, a valve opens in that case ("boil-off valve" (BOV)), which releases gaseous hydrogen into the environment. In order to rule out any endangerment (for example, ignition or explosion) as a result of excessive hydrogen concentrations in the environment, the gas released can be catalytically reacted with oxygen from the ambient air, and hence, reacts to give water vapour. This system is referred to as a boil-off management system (BOMS). Since, during the operation of a hydrogen vehicle, a sufficient amount of gaseous hydrogen will always be withdrawn or can be withdrawn for operation, the BOMS is typically required only if the vehicle is stationary for a prolonged period of time, after the "dormancy time." As soon as the boil-off valve opens, and only then, does outflow, mixing with air and the catalytic conversion of the hydrogen vented take place purely passively, i.e., without human involvement or involvement of further electronic or mechanical systems.

Under adverse boundary conditions (temperature, humidity, ageing, . . . ), that can occur particularly on startup of a BOMS, the catalytic action of the catalytic converter is reduced. Moreover, the reaction rate of the hydrogen-oxygen mixture is reduced. This can lead to a high $H_2$ slip, i.e., a large amount of unconverted hydrogen that flows out of the exhaust gas pipe.

SUMMARY

It is an object of the disclosure to specify a boil-off management system for a cryotank which reduces hydrogen slip under adverse conditions, especially directly after the startup of the boil-off management system, and to specify a corresponding cryotank having such a boil-off management system. It is also an object of the disclosure to specify a method of operating such a boil-off management system, wherein the occurrence of hydrogen slip is reduced.

The object is achieved by a boil-off management system for a cryotank, comprising a boil-off conduit which is fluidically connectable to a cryotank and has a boil-off valve, and an air feed conduit and a mixing chamber for mixing the medium flowing in through the boil-off conduit, especially hydrogen, with the medium flowing in through the air feed conduit, especially air and/or oxygen, and a catalytic converter downstream of the mixing chamber and an outlet downstream of the catalytic converter, wherein the boil-off management system comprises at least one enrichment apparatus, wherein the enrichment apparatus can temporarily increase the proportion of the medium flowing in through the boil-off conduit in relation to the medium flowing in through the air feed conduit at the catalytic converter.

The disclosure envisages equipping a boil-off management system with an enrichment apparatus that can temporarily increase the proportion of medium to be released and converted at the catalytic converter, especially hydrogen, so as to result in a higher hydrogen content and a lower air ratio at the catalytic converter during the existence of adverse conditions at the catalytic converter, especially during or directly after the startup of the boil-off management system. When the conditions are better, for example when the temperature at the catalytic converter has risen, these measures can be ended, such that the ratio between hydrogen and air is that which is customary in normal operation, i.e., the air ratio is normal.

As a result, even under difficult conditions, good catalytic conversion of the medium to be released, especially hydrogen, is enabled. This is accomplished by a time-limited increase in the $H_2$ concentration in the region of the catalytic converter. For example, it is thus possible to accelerate or improve the startup characteristics of the catalytic converter, preferably without additional energy requirement.

The catalytic converter serves for catalytic conversion of the medium released from the cryotank, especially hydrogen, preferably with air or oxygen from the environment.

Developments of the disclosure are specified in the dependent claims, the description and the appended drawings.

The enrichment apparatus is preferably designed such that the proportion of the medium flowing in through the boil-off conduit in relation to the medium flowing in through the air feed conduit at the catalytic converter is increased in the case of existence of an enrichment criterion, namely after a startup operation of the boil-off management system, and/or in the case of existence of an impairment at the catalytic converter, such as a low temperature and/or high humidity and/or a deterioration in the chemical state of the catalytic converter, for example owing to ageing.

The enrichment apparatus is preferably designed such that the proportion of the medium flowing in through the boil-off conduit in relation to the medium flowing in through the air feed conduit at the catalytic converter is not increased when an enrichment criterion does not exist or no longer exists, especially on attainment of the operating temperature of the catalytic converter.

Preferably, the enrichment apparatus comprises a control unit for recognizing the existence of an enrichment criterion and/or an electrical actuator in order to temporarily increase and/or to stop increasing the proportion of the medium flowing in through the boil-off conduit in relation to the medium flowing in through the air feed conduit at the catalytic converter.

In a preferred embodiment, the enrichment apparatus is activated mechanically in the event of existence of a predetermined pressure or a predetermined temperature in such a way that the proportion of the medium flowing in through the boil-off conduit is increased in relation to the medium flowing in through the air feed conduit at the catalytic converter and/or the enrichment apparatus is deactivated mechanically in the event of existence of a predetermined pressure or a predetermined temperature in such a way that the proportion of the medium flowing in through the boil-off conduit is not increased in relation to the medium flowing in through the air feed conduit at the catalytic converter.

The enrichment apparatus preferably works passively. Preference is given to optimizing the starting characteristics of the BOMS without additional active components, with additional energy demand. The startup characteristics of the catalytic converter are preferably accelerated without additional energy demand.

The enrichment apparatus preferably comprises a closure in the air feed conduit, especially a flap, a lid or lamellas, such that the air feed in the air feed conduit is stopped or reduced when the closure is wholly or partly closed.

For example, in the case of startup of the BOMS, a closed or partly opened and/or slotted movable closure, for example flap, lid, lamellas, optionally divided into multiple opening stages, is used. The throttling of the air feed reduces the air ratio until catalysis commences. After the conversion of the hydrogen has started, associated with increasing catalytic converter temperature, the throttle may, for example, be opened in an electrically actuated manner or mechanically by means of a bimetallic method or oil pressure or the like.

The enrichment apparatus preferably comprises a closure at the outlet, especially a flap, a lid or lamellas, such that escape of the medium downstream of the catalytic converter is prevented or reduced when the closure is wholly or partly closed, such that it can at least partly return or be recirculated to the catalytic converter.

For example, in the case of startup of the BOMS, a closed or partly open and/or slotted movable closure, for example flap, lid, lamellas, optionally divided into multiple opening stages, is used. The throttling of the offgas stream at the outlet for the offgases, for example in a chimney, reduces the air ratio until catalysis commences. The partial or complete closure of the outlet, especially of the chimney, results in partial recycling of unconverted hydrogen back to the catalytic converter. After the conversion of the hydrogen has commenced, the closure opens as a result of the momentum of the offgas stream. After the conversion of hydrogen has ended, the closure closes automatically. If required, the closure may be electrically actuated at high temperatures in the BOMS and/or the offgas or opened mechanically by means of a bimetallic method or oil pressure or the like.

The enrichment apparatus preferably comprises a nozzle, in which case the nozzle is set up to supply, especially spray in, medium flowing in through the boil-off conduit at the catalytic converter or upstream of the catalytic converter.

Preferably, a reactive fluid, preferably hydrogen, is withdrawn, preferably from the cryotank, but optionally also from a separate vessel, and fed via a conduit and nozzle directly to the catalytic converter or to the air-H2 mixture flowing in, and hence the air ratio at the catalytic converter is lowered in an at least locally limited manner.

The conduit for supply of the spray injection may be closed automatically, for example, by a bimetallic method or oil pressure on attainment of the operating temperature of the catalytic converter.

A boil-off management system of the disclosure or a cryotank apparatus of the disclosure may also comprise any combination of two or more of the abovementioned enrichment apparatuses, for example a closure in the air feed conduit and a further closure at the outlet.

A cryotank apparatus of the disclosure comprises a cryotank and a boil-off management system as described above, wherein the boil-off conduit of the boil-off management system is fluidically connected to the cryotank such that, when the boil-off valve is open, a fluid, especially hydrogen, can flow out of the cryotank to the mixing chamber and further to the catalytic converter of the BOMS.

In a method of the disclosure, for operation of a boil-off management system, the proportion of the medium flowing in through the boil-off conduit in relation to the medium flowing in through the air feed conduit at the catalytic converter, in the case of existence of an enrichment criterion, namely after a startup operation of the boil-off management system, and/or in the case of existence of an impairment at the catalytic converter, such as a low temperature and/or high humidity and/or deterioration of the chemical condition of the catalytic converter, for example owing to ageing, is increased and/or, in the case that the enrichment criterion no longer applies, is no longer increased. The enrichment with hydrogen or the reduction in the air ratio is thus preferably reduced when, for example, the catalytic converter has attained a predetermined temperature.

Preferably, a closure in the air feed conduit and/or a closure at the outlet is wholly or partly opened and/or the medium flowing in through the boil-off conduit is no longer supplied by means of a nozzle at the catalytic converter or upstream of the catalytic converter when an enrichment criterion no longer exists, especially when a predetermined temperature at the catalytic converter is attained.

DRAWINGS

The disclosure is described hereinafter by way of example with reference to the drawings. Like reference symbols in the various drawings may indicate like elements.

DESCRIPTION

Figures 1, 2:
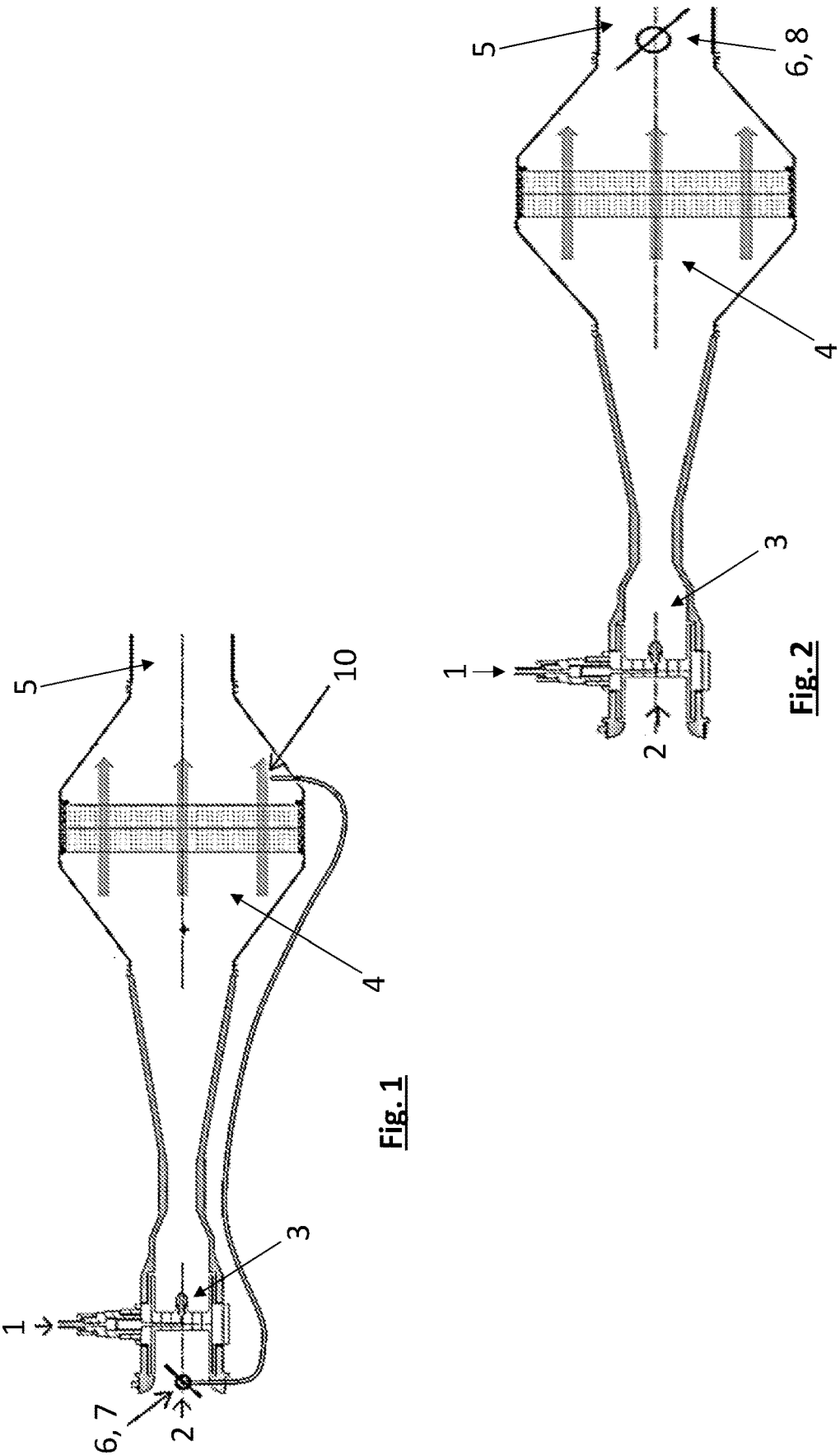
FIG. 1 is a schematic section view of a boil-off management system of the disclosure in a first embodiment.
FIG. 2 is a schematic section view of a boil-off management system of the disclosure in a second embodiment.

FIG. 1 shows a boil-off management system of the disclosure in a first embodiment.

The boil-off management system of a cryotank (not shown here) comprises a boil-off conduit 1 which is fluidically connectable to a cryotank and is connected to the cryotank via a boil-off valve. When the boil-off valve is open, hydrogen flows through the boil-off conduit 1.

The boil-off management system also comprises an air feed conduit 2 through which fresh air can be fed in and is miscible in a mixing chamber 3 with the hydrogen from the boil-off conduit 1.

Downstream of the mixing chamber 3 in a flow direction is a catalytic converter 4, for catalytic conversion of the hydrogen with atmospheric/ambient oxygen, before a downstream outlet 5, for release of the medium downstream of the catalytic converter into the environment of a motor vehicle. In the catalytic converter 4, the customary flow direction of the gas mixture to be released is shown by arrows.

The boil-off management system comprises an enrichment apparatus 6 configured to temporarily increase the proportion of the medium flowing in through the boil-off conduit 1 in relation to the medium flowing in through the air feed conduit 2 at the catalytic converter 4.

The enrichment apparatus 6, in FIG. 1, is formed by a closure 7, namely a flap, in the air feed conduit 2. In the case of a wholly or partly closed closure 7, the air supply in the air feed conduit 2 is thus stopped or reduced. The closure 7 may, for example, be mechanically connected to a thermostat 10 and may open or close depending on the temperature at the thermostat.

For example, in the case of startup of the BOMS, the closure 7 is closed. The throttling of the air feed reduces the air ratio until catalysis commences. After the conversion of the hydrogen has commenced, associated with increasing temperature of the catalytic converter 4, the throttle, namely the closure 7, may be opened, for example by electrical actuation or mechanically, for example, by a bimetallic method or oil pressure or the like.

In the variant of FIG. 2, the enrichment apparatus 6 is formed by a closure 8 in the outlet 5, namely a movable, especially pivotable, flap, such that, when the closure 8 is wholly or partly closed, escape of the medium downstream of the catalytic converter 4 is prevented or reduced, such that it is recycled at least partly to the catalytic converter 4.

For example, in the case of startup of the BOMS, a closed or partly open and/or slotted movable closure 8, for example flap, is used. The throttling of the offgas stream at the outlet 5, for example in a chimney, reduces the air ratio until catalysis commences. By virtue of the partial or complete closure of the outlet, especially of the chimney, unconverted hydrogen is partly recycled to the catalytic converter 4. After the conversion of the hydrogen has commenced, the closure 8 opens as a result of the momentum of the offgas stream. After the conversion of hydrogen has ended, the closure 8 closes automatically. If required, the closure 8, in the case of high temperatures in the BOMS and/or the offgas, may be opened in an electrically actuated manner or mechanically by a bimetallic method or oil pressure or the like.

Figure 3:
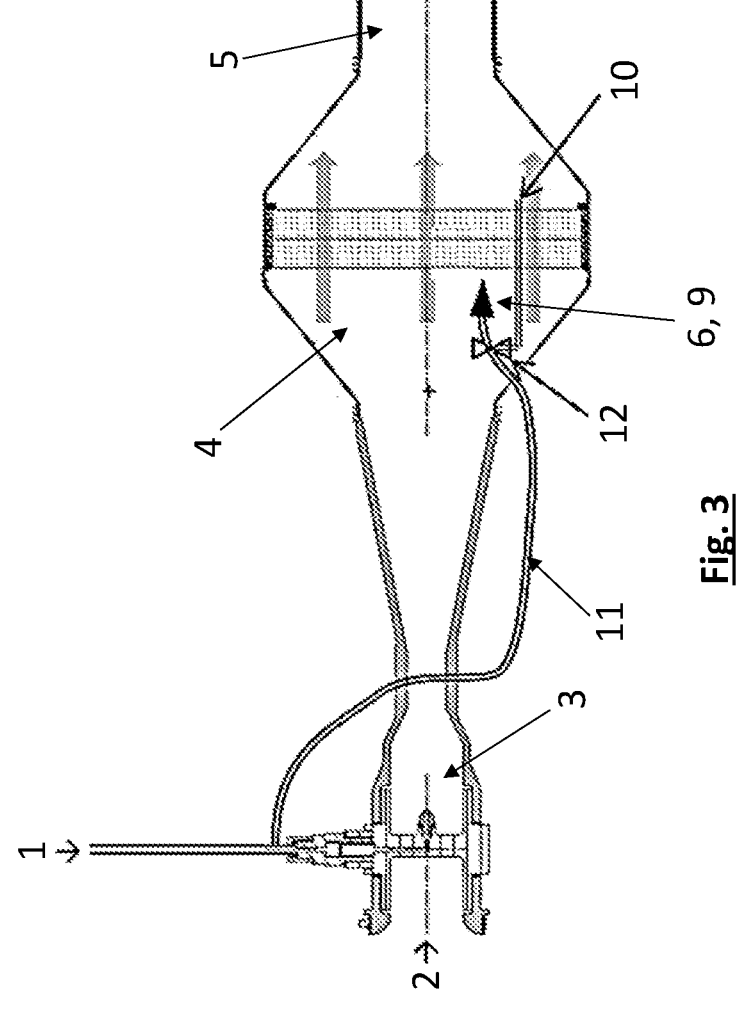
FIG. 3 is a schematic section view of a boil-off management system of the disclosure in a third embodiment.

In the embodiment according to FIG. 3, the enrichment apparatus 6 is formed by a nozzle 9 with which medium flowing in through the boil-off conduit 1 can be fed, especially sprayed, into the catalytic converter 4 or upstream of the catalytic converter 4. The nozzle 9 is flow-connected to the boil-off conduit 1, for example, via a feed conduit 11 and has a valve 12 upstream of the nozzle 9 in order to enable the injection of the hydrogen with valve 12 open, and to prevent it with valve 12 closed. The valve 12 may again be mechanically opened and closed by means of a thermostat 10, for example.

Preferably, a reactive fluid, preferably hydrogen, is withdrawn, preferably from the cryotank, but optionally also from a separate vessel, and fed via the feed conduit 11 and the nozzle 9 directly to the catalytic converter 4 or to the air-H2 mixture flowing in, and hence the air ratio at the catalytic converter 4 is lowered in an at least locally limited manner.

The feed conduit 11 for supply of the spray injection, or the valve 12 set up therefor, may be automatically closed, for example, by a bimetallic method or oil pressure on attainment of the operating temperature of the catalytic converter 4.

LIST OF REFERENCE SYMBOLS

1 boil-off conduit
2 air feed conduit
3 mixing chamber
4 catalytic converter
5 outlet
6 enrichment apparatus
7 closure in the air feed conduit
8 closure at the outlet
9 nozzle
10 thermostat

11 feed conduit
12 valve

What is claimed is:

1. A boil-off management system for a cryotank, comprising:
    a boil-off conduit having a boil-off valve which is fluidically connectable to a cryotank, through which is received a first medium that includes hydrogen;
    an air feed conduit, through which is received a second medium that includes air and/or oxygen;
    a mixing chamber configured to mix the first medium with the second medium;
    a catalytic converter arranged downstream of the mixing chamber;
    an outlet arranged downstream of the catalytic converter; and
    at least one enrichment comprising a control unit configured to detect an existence of an enrichment criterion, temporarily increase a proportion of the first medium in relation to the second medium flowing at the catalytic converter, and stop an increase in the proportion of the first medium in relation to the second medium flowing at the catalytic converter.

2. The boil-off management system of claim 1, wherein the enrichment apparatus is configured such that the proportion of the first medium in relation to the second medium at the catalytic converter is increased in response to a startup operation of the boil-off management system.

3. The boil-off management system of claim 1, wherein the enrichment apparatus is configured such that the proportion of the first medium in relation to the second medium at the catalytic converter is increased in response to an impairment to the catalytic converter.

4. The boil-off management system of claim 1, wherein the enrichment apparatus is configured such that the proportion of the first medium in relation to the second medium at the catalytic converter is increased in response to a detected low temperature of the catalytic converter.

5. The boil-off management system of claim 1, wherein the enrichment apparatus is configured such that the proportion of the first medium in relation to the second medium at the catalytic converter is increased in response to a detected high humidity condition of the catalytic converter.

6. The boil-off management system of claim 1, wherein the enrichment apparatus is configured such that the proportion of the first medium in relation to the second medium at the catalytic converter is increased in response to a detected deterioration of a chemical condition of the catalytic converter.

7. The boil-off management system of claim 1, wherein the enrichment apparatus is mechanically activated in response to a detected predetermined pressure or a detected predetermined temperature in such a way that the proportion of the first medium is increased in relation to the second medium at the catalytic converter.

8. The boil-off management system of claim 1, wherein the enrichment apparatus is mechanically deactivated in response to a detected predetermined pressure or a predetermined temperature in such a way that the proportion of the first medium is not increased in relation to the second medium flowing at the catalytic converter.

9. The boil-off management system of claim 1, wherein the enrichment apparatus comprises a closure at the air feed conduit that is configured, when in a wholly closed position or a partially closed position, to stop or reduce the flow of air in the air feed conduit.

10. The boil-off management system of claim 9, wherein the closure comprises a flap, a lid, or lamellas.

11. The boil-off management system of claim 1, wherein the enrichment apparatus comprises a closure at the outlet that is configured to, when in a wholly closed position or a partially closed position, prevent or reduce escape of the medium downstream of the catalytic converter in a manner such that the medium is at least be recirculated to the catalytic converter.

12. The boil-off management system of claim 11, wherein the closure comprises a flap, a lid, or lamellas.

13. The boil-off management system of claim 1, wherein the enrichment apparatus comprises a nozzle configured to feed the first medium at the catalytic converter or upstream of the catalytic converter.

14. A cryotank apparatus, comprising:

a cryotank; and a boil-off management system fluidically connected to the cryotank, the boil-off management system including:

a boil-off conduit having a boil-off valve which is fluidically connectable to a cryotank, through which is received a first medium that includes hydrogen;

an air feed conduit, through which is received a second medium that includes air and/or oxygen;

a mixing chamber configured to mix the first medium with the second medium;

a catalytic converter arranged downstream of the mixing chamber;

an outlet arranged downstream of the catalytic converter; and at least one enrichment apparatus comprising a control unit configured to detect an existence of an enrichment criterion, temporarily increase a proportion of the first medium in relation to the second medium flowing at the catalytic converter, and stop an increase in the proportion of the first medium in relation to the second medium flowing at the catalytic converter.

15. The cryotank apparatus according to claim 14, wherein the enrichment apparatus comprises a nozzle configured to feed the first medium at the catalytic converter or upstream of the catalytic converter.

16. A method of operating a boil-off management system of claim 1, the method comprising:

increasing, in response to a detection of a startup operation of the boil-off management system and/or an impairment at the catalytic converter, the proportion of the first medium flowing in through the boil-off conduit in relation to the second medium flowing in through the air feed conduit at the catalytic converter.

17. The method of claim 16, wherein the impairment at the catalytic converter comprises a low temperature of the catalytic converter.

18. The method of claim 16, wherein the impairment at the catalytic converter comprises a high humidity condition of the catalytic converter.

19. The method of claim 16, wherein the impairment at the catalytic converter comprises a deterioration of a chemical condition of the catalytic converter.

20. The method of claim 16, further comprising, in response to a detection of a predetermined temperature at the catalytic converter:

wholly or partially opening a closure in the air feed conduit and/or a closure at the outlet, and/or stopping a flow of the first medium through the boil-off conduit at the catalytic converter or upstream of the catalytic converter.

* * * * *